Patented May 12, 1925.

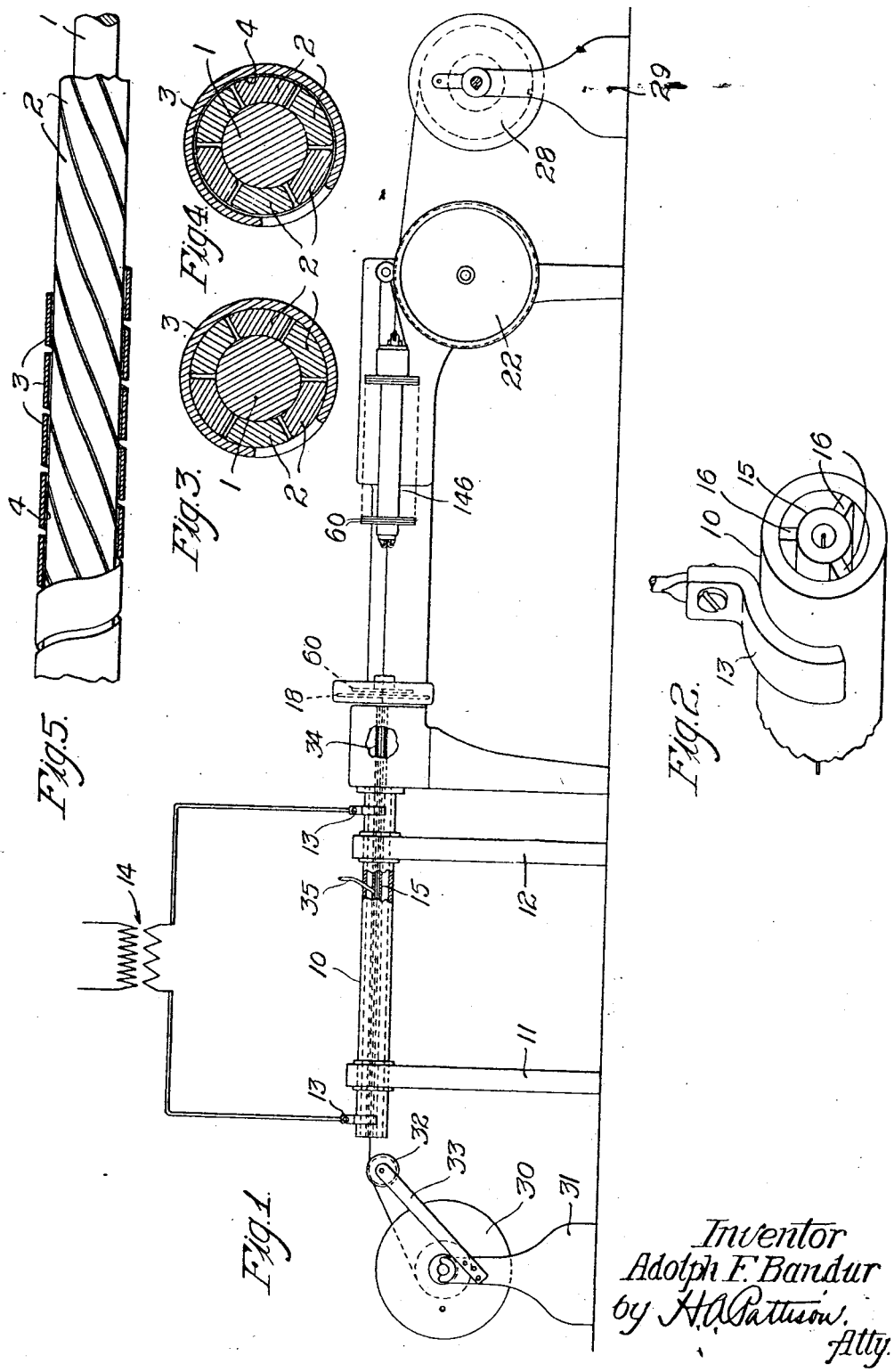

1,537,575

UNITED STATES PATENT OFFICE.

ADOLPH FRANCIS BANDUR, OF BERWYN, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR APPLYING A SERVING TO A CORE.

Application filed February 24, 1923. Serial No. 620,918.

*To all whom it may concern:*

Be it known that I, ADOLPH FRANCIS BANDUR, a citizen of the United States, residing at Berwyn, in the county of Cook and State of Illinois, have invented certain new and useful Improvements in Methods of and Apparatus for Applying a Serving to a Core, of which the following is a full, clear, concise, and exact description.

This invention relates to a method of and an apparatus for applying a serving to a core, and more particularly to applying a metallic serving to a metallic core.

The primary object of the invention is to apply a serving to a core in such a manner that there is a definite degree of looseness between the core and the associated serving.

Another object of the invention is to apply loading material to a signalling conductor in such a manner that the loading material is not subjected to deleterious stresses or strains during the manufacture and use of the loaded conductor.

A further object of the invention is to so apply loading material to a signalling conductor that the loading material is not subjected to deleterious stresses or strains during a subsequent heat treatment of the loaded conductor.

A still further object of the invention is to apply loading material to a signalling conductor in such manner as to provide a clearance between the loading material and the conductor for the reception of a filling material which will minimize the stresses or strains to which the loading material may be subjected during the manufacture, storage, or use of the loaded conductor.

Briefly, the method consists in expanding the core by heating, or otherwise, to approximately the greatest size which it will attain thereafter in its manufacture or service, and then applying the serving material to the expanded core. This method is of especial utility in connection with the manufacture of a loaded signalling conductor wherein the electrical characteristics of the served loading material depend to some extent upon a heat treatment to which the loaded conductor is subjected.

An apparatus by which the method may be practiced comprises a strand serving machine for applying the serving material to the core, which machine includes means for heating the core prior to its being subjected to the operation of the serving head.

The word "core" as used in the specification and claims is to be understood as defining and including any central body either of simple or complex character adapted to receive a serving or covering of any nature. Also the word "strand" as used herein is to be understood as defining and including any fiber, filament, sliver, cord, tape, or ribbon.

The method herein disclosed is of particular utility where loading material is applied in the form of a tape consisting of an alloy the metallurgical and electrical characteristics of which are fully disclosed in the co-pending applications of Gustaf W. Elmen, Serial No. 477,877, filed May 31, 1921; Oliver E. Buckley, Serial No. 492,725, filed August 16, 1921; and Gustaf W. Elmen, Serial No. 557,928, filed May 2, 1922, to which reference should be made for a full disclosure thereof. It is sufficient for an understanding of the present invention to state that this tape is made of an alloy which has the characteristic of high permeability at low magnetizing forces, this characteristic being determined to some extent by a particular form of heat treatment. It has been found that if a loading material of this type is subjected to stresses or strains, the permeability thereof is reduced and these deleterious strains or stresses may occur during the heat treatment of the loaded conductor. In instances where the loading material has been subjected to deleterious strains during the heat treatment thereof, it is believed that these strains have been occasioned by the expansion of the conductor during the heat treatment, the conductor being made of copper having a coefficient of expansion approximately 35 per cent greater than the coefficient of expansion of the loading material, which comprises essentially a nickel iron alloy.

When a loading material of this type is applied to a signalling conductor by the method herein disclosed space is provided between the conductor and the loading material sufficient to permit the conductor to expand during the heat treatment without subjecting the loading material to deleterious stresses or strains. One method consists in maintaining the conductor, at the time of the application of the loading material thereto, at a temperature approximately the same as that to which the conductor will be subjected during the heat treatment of the loading material. As a result when the loaded conductor cools, the loading material will be spaced from the conductor a distance representing the amount the conductor will expand during the heat treatment of the loading material, so that when the loaded conductor is subjected to the heat treatment, the copper conductor will not expand to a size greater than its size at the time of the application of the loading material. Thus the expansion of the copper conductor during the heat treatment will not subject the loading material to any deleterious stresses or strains.

The heating means may be of any suitable type such as a tube of electrical resistance material which is heated by passing current therethrough, the tube being placed adjacent the taping machine so that the core is fed therethrough on its way to the taping head, heat insulating material being placed between the framework of the machine and the heated core so that the temperature of the core is not materially diminished between its egress from the tube and the application of the tape thereto. Where the core is an electrical conductor, in place of the tube above described, it may be found desirable to heat the conductor by passing an electric current therethrough of sufficient strength to heat the conductor due to its resistance to the passage of such current.

In the drawings illustrating one embodiment of the invention,

Fig. 1 is a side elevation of an apparatus by which the method may be practiced;

Fig. 2 is an enlarged fragmentary perspective view of one end of the heating tube;

Fig. 3 is a cross-sectional view showing a loaded signalling conductor during the application of the loading material thereto, the core and loading material being in their expanded conditions;

Figs. 4 and 5 are cross-sectional and plan views respectively of a loaded signalling conductor manufactured in accordance with this process and showing the loaded conductor after the conductor and loading material have contracted.

The apparatus illustrated in the drawings is particularly adapted to apply to a signalling conductor loading material in the form of an alloy tape having the metallurgical and electrical characteristics described in the co-pending applications above referred to.

In its preferred form this apparatus includes a tube of electrical resistance material 10 such as nichrome, supported from the floor by suitably insulated supports 11 and 12.

Attached to the ends of the tube 10 by means of clamps 13 are terminals of the secondary circuit of a transformer 14, the primary of which may be connected in any usual well-known manner to a suitable source of electrical-current. Mounted within the tube 10 is a second tube 15 formed of nichrome or other suitable material of high melting point and spaced and insulated from the tube 10 by spacers 16 formed of asbestos or other suitable insulating material.

A spool or reel 30 revolubly supported from the floor on a pair of brackets 31 carries a supply of the core material in strand form. This core comprises a central copper wire 1 surrounded by a plurality of helically applied segmental copper strips 2. The core is fed from the spool 30 over an idler roll 32 supported in any suitable manner, as by a bracket 33 attached to one of the brackets 31. The core passes from the roll 32 through the tube 15 where it is heated and thence through an opening 34 in the serving machine which is lined with a heat insulating material to prevent dissipation of the heat from the core. Upon its egress from the opening 34 the core passes through the taping head 18 illustrated as being of the type disclosed in a co-pending application of F. S. Kochendorfer and M. R. Robinson, Serial No. 585,562, filed August 31, 1922, which applies tape 3 to the core from a tape carrier 60 which may be taken from the magazine 146 and attached to the taping head. The taped core passes through the magazine and around a capstan 22 mounted at the right hand end of the machine and onto a receiving reel 28 revolubly supported upon a pair of brackets 29. The receiving spool may be driven in any usual manner from a suitable source of power. After being placed on the receiving reel 28 the taped core may then be subjected to the heat treatment described in the co-pending applications above referred to.

In this heat treatment the loaded conductor is subjected to a maximum temperature of approximately 1562° Fahrenheit, and in order to expand the core sufficiently at the time of the application of the tape thereto so that the core will not expand to a greater extent during the heat treatment of the tape the heating means has a temperature sufficient to maintain the conductor at a temperature of approximately not less than 1100° Fahrenheit and not greater than 1562° Fahrenheit at the time of the application of the tape to the conductor. When the conductor has been heated to these temperatures during the application of the loading material thereto, it will be found that upon cooling, the tape will surround the conductor with a definite degree of looseness, a space being provided between the conductor and tape of approximately two thousandths of an inch as indicated at 4, Fig. 4.

When a loaded conductor of this nature is used in submarine cables, it is desirable to introduce a viscous filling material between the conductor and the loading material in order to minimize the stresses or strains which may be placed upon the loading material during the manufacture, storage, or use of the cable. The definite amount of clearance 4 provides a space between the spiral tape and the conductor, in which this filling material (not shown) may be placed. This filling material may be of any suitable character but preferably of the type disclosed in a co-pending application of Archie R. Kemp, Serial No. 617,511, filed February 7, 1923, which application also discloses the method by which the filling material is applied.

In some cases it may be desirable to introduce into the heating chamber nitrogen or other suitable gases to provide a non-oxidizing and non-reducing atmosphere in the chamber or otherwise control the characteristics of the atmosphere in the chamber. These gases may be introduced into the tube 15 through a pipe 35 connected with any source of suitable gaseous supply.

What is claimed is:

1. The method of applying a strand serving to a core, which consists in maintaining the core at a different temperature from that of the serving at the time of the application of the serving.

2. The method of applying a strand serving to a core, which consists in expanding the core and applying the serving to the expanded core.

3. The method of applying a strand serving to a core with a definite degree of looseness, which consists in maintaining the core at a different temperature from the strand serving at the time of application of the strand serving.

4. The method of applying a strand serving to a metallic core with a definite degree of looseness, which consists in maintaining the core at a different temperature from the strand serving at the time of application of the strand serving.

5. The method of applying a metallic strand serving to a wire with a definite degree of looseness, which consists in maintaining the wire at a different temperature from the metallic strand serving at the time of application of the serving.

6. The method of applying a loading material to a conductor, which consists in maintaining the core at a different temperature from that of the loading material at the time of the application of the loading material.

7. The method of applying a loading material to a conductor, which consists in expanding the conductor and applying the loading material to the expanded conductor.

8. The method of applying loading material to a conductor with a definite degree of looseness, which consists in expanding the conductor and then applying the loading material to the expanded conductor.

9. The method of applying loading material to a conductor with a definite degree of looseness, which consists in maintaining the conductor at a different temperature from the loading material at the time of application of the loading material.

10. The method of applying loading material in strand form to a conductor with a definite degree of looseness, which consists in maintaining the conductor at a different temperature from the loading material at the time of the application of the loading material.

11. The method of applying a metallic tape to a wire with a definite degree of looseness, which consists in maintaining the wire at a different temperature from the tape at the time of application of the tape.

12. The method of applying a loading material in tape form to a conductor with a definite degree of looseness, which consists in maintaining the conductor at a different temperature from the tape at the time of application of the tape.

13. The method of applying a strand serving to a core, which consists in heating the core to a temperature higher than that of the strand serving and then applying the strand serving to the core while the temperature of the core is higher than that of the strand serving.

14. The method of applying a strand serving to a core with a definite degree of looseness, which consists in heating the core to a temperature higher than that of the strand serving and then applying the strand serving to the core while the temperature of the core is higher than that of the strand serving.

15. The method of applying loading material to a conductor with a definite degree of looseness, which consists in heating the conductor to a temperature higher than that of the loading material and then applying the loading material to the conductor while the temperature of the conductor is higher than that of the loading material.

16. The method of applying a strand serving to a core, which consists in maintaining the core at a temperature of not less than approximately 1100° Fahrenheit while the serving is being applied to the core.

17. The method of applying a strand serving to a core, which consists in maintaining the core at a temperature of not more than approximately 1562° Fahrenheit while the serving is being applied to the core.

18. The method of applying a strand serving to a core, which consists in maintaining the core at a temperature between approximately 1100° Fahrenheit and 1562° Fahrenheit while the serving is being applied thereto.

19. The method of applying a strand serving to a core with a definite degree of looseness, which consists in maintaining the core at a temperature of not less than approximately 1100° Fahrenheit while the serving is being applied to the core.

20. The method of applying a strand serving to a core with a definite degree of looseness, which consists in heating the core to such a temperature that the said core will have a temperature of not less than approximately 1100° Fahrenheit while the serving is being applied thereto.

21. The method of applying a strand serving to a core with a definite degree of looseness, which consists in maintaining the core at a temperature of not more than approximately 1562° Fahrenheit while the serving is being applied to the core.

22. The method of applying a strand serving to a core with a definite degree of looseness, which consists in heating the core to such a temperature that the said core will have a temperature of not more than approximately 1562° Fahrenheit while the serving is being applied to the core.

23. The method of applying a strand serving to a core with a definite degree of looseness, which consists in maintaining the core at a temperature between approximately 1100° Fahrenheit and 1562° Fahrenheit while the serving is being applied thereto.

24. The method of applying a strand serving to a core with a definite degree of looseness, which consists in heating the core to such a temperature that the said core will have a temperature between approximately 1100° Fahrenheit and 1562° Fahrenheit while the serving is being applied thereto.

25. The method of applying a strand serving to a core with a definite degree of looseness, which consists in heating the core to a temperature not less than approximately 1100° Fahrenheit and not more than 1562° Fahrenheit and applying a serving thereto while the core is maintained at such temperatures.

26. The method of applying loading material to a conductor, which consists in maintaining the conductor at a temperature of not less than approximately 1100° Fahrenheit while the loading material is being applied to the conductor.

27. The method of applying loading material to a conductor which consists in maintaining the conductor at a temperature of not more than approximately 1562° Fahrenheit while the loading material is being applied to the conductor.

28. The method of applying loading material to a conductor which consists in maintaining the conductor at a temperature between approximately 1100° Fahrenheit and 1562° Fahrenheit while the loading material is being applied to the conductor.

29. The method of applying a metallic serving to a metallic core, the serving and core having different temperature coefficients of expansion, which consists in maintaining the core at a different temperature from that of the serving at the time of application of the serving thereto.

30. The method of applying a metallic serving to a metallic core, the core and the serving having different temperature coefficients of expansion, which consists in maintaining at a higher temperature the element having the higher temperature coefficient of expansion during the application of the serving.

31. The method of applying loading material to a conductor, the loading material having a lower temperature coefficient of expansion than the conductor, which consists in maintaining the conductor at a higher temperature than the loading material during the application of the loading material.

32. The method of applying a strand serving to a core, which consists in maintaining the core and serving at different temperatures during the application of the serving, whereby a clearance of approximately two thousandths of an inch is provided between the serving and the core when the serving and the core are at approximately the same temperature.

33. The method of applying a strand serving to a core, which consists in maintaining the core and serving at different temperatures during the application of the serving, whereby a clearance of approximately two thousandths of an inch is provided between the serving and the core when the core has a temperature approximately equal to the temperature of the serving during the serving operation.

34. The method of applying a strand serving to a core, the temperature coefficient of expansion of the core being thirty-five per cent. greater than that of the serving, which consists in maintaining the core at a different temperature from that of the serving during the application of the serving.

35. The method of applying a serving to a core where the served core is to be subjected to a heat treatment, which consists in maintaining the core at a temperature during the application of the serving which in approximately as high as the temperature to which the core is subjected during the said heat treatment.

36. The method of applying loading material to a conductor where the loaded conductor is to be subjected to a heat treatment, which consists in maintaining the conductor at a temperature during the application of the loading material which is approximately as high as the temperature to which the conductor is subjected during the said heat treatment.

37. The method of reducing the strains on the loading material of a loaded conductor, which consists in maintaining the conductor at a temperature different from that of the loading material at the time of application of the loading material.

38. The method of manufacturing a loaded submarine cable comprising a conductor, a serving of loaded material, and a filling material, which consists in serving the loading material on the conductor and maintaining the conductor at a temperature different from that of the serving during the application of the serving to provide a clearance between the serving and the conductor for the filling material.

39. The method of manufacturing a loaded submarine cable comprising a conductor, a serving of loaded material, which consists in serving the loaded material on the conductor and maintaining the conductor at a temperature different from that of the serving during the application of the serving to provide a clearance between the serving and the conductor to reduce the strains on the loading material.

40. The method of manufacturing a loaded submarine cable comprising a conductor, a heat treated loading material, which consists in applying the loading material to the conductor while maintaining the conductor at a temperature different from that of the loading material to provide a clearance between the loading material and conductor, to reduce the strains on the loading material during the heat treatment thereof.

41. The method of manufacturing a loaded submarine cable comprising a conductor, a heat treated loading material, and a filling material, which consists in applying the loading material to the conductor while maintaining the conductor at a temperature different from that of the loading material to provide a clearance between the loading material and conductor, to replace the strains on the loading material during the heat treatment thereof and provide a space for the filling material between the loading material and the conductor.

42. The method of manufacturing a loaded submarine cable comprising a conductor, a heat treated loading material, which consists in applying the loading material to the conductor and maintaining the conductor at a temperature during such application which is approximately as high as the temperature to which the conductor is subjected during the said heat treatment to reduce the strains on the loading material during the heat treatment thereof.

43. The method of applying a strand serving to a core, which consists in heating the core in a non-oxidizing atmosphere to a temperature different from that of the strand serving and applying the serving while the core remains heated.

44. The method of applying a strand serving to a core, which consists in heating the core in the presence of a non-reducing atmosphere to a temperature different from that of the serving and then applying the serving to the core.

45. The method of applying a strand serving to a core, which consists in heating the core in the presence of a non-oxidizing and non-reducing atmosphere to a temperature different from that of the serving and then applying the serving to the core.

46. In a mechanism for serving a strand on a core, a supply of serving material, heating means for the core, means for subjecting the core to the heating means, and means for causing relative movement between the core and the supply of serving material to apply the serving material to the core.

47. In an apparatus for applying a strand serving to a core, a rotatable serving head, a carrier for the serving material rotatable with the head in such manner that the serving material is served on the core, heating means, and means for subjecting the core to the heating means and passing it through the serving head.

48. In an apparatus for applying a strand serving to a core, a rotatable serving head, a carrier for the serving material rotatable with the head in such manner that the serving material is served on the core, a heating chamber, and means for drawing the core through the heated chamber and rotatable serving head.

49. In an apparatus for applying a strand serving to a core, a rotatable serving head, a carrier for the serving material rotatable with the head in such manner that the serving material is served on the core, means for expanding the core, and means for subjecting the core to said expanding means and to the rotatable serving head 50. In a mechanism for serving a strand on a core, a supply of serving material, expanding means for the core, means for subjecting the core to the expanding means, and means for causing relative movement between the core and the supply of serving material to apply the serving material to the core.

In witness whereof, I hereunto subscribe my name this 19th day of Feb. A. D., 1923.

ADOLPH FRANCIS BANDUR.